US012162282B2

(12) United States Patent
Hashimoto et al.

(10) Patent No.: US 12,162,282 B2
(45) Date of Patent: Dec. 10, 2024

(54) PRINT HEAD AND METHOD OF MANUFACTURING PRINT HEAD

(71) Applicant: CANON KABUSHIKI KAISHA, Tokyo (JP)

(72) Inventors: Yusuke Hashimoto, Kanagawa (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 17/818,403

(22) Filed: Aug. 9, 2022

(65) Prior Publication Data

US 2023/0066943 A1 Mar. 2, 2023

(30) Foreign Application Priority Data

Aug. 26, 2021 (JP) ................................ 2021-137998

(51) Int. Cl.
*B41J 2/14* (2006.01)
*B41J 2/16* (2006.01)

(52) U.S. Cl.
CPC ......... *B41J 2/14072* (2013.01); *B41J 2/1601* (2013.01); *B41J 2/164* (2013.01)

(58) Field of Classification Search
CPC ...... B41J 2/14072; B41J 2/1601; B41J 2/164; B41J 2/1603; B41J 2/1623; B41J 2/1626; B41J 2/1631; B41J 2/1643; B41J 2/1645
See application file for complete search history.

(56) References Cited

U.S. PATENT DOCUMENTS 8,007,076 B2 8/2011 Ono
2007/0211115 A1* 9/2007 Ibe ........................ B41J 2/1643 347/58

FOREIGN PATENT DOCUMENTS

JP 2009-905 A 1/2009

* cited by examiner

*Primary Examiner* — Bradley W Thies
(74) *Attorney, Agent, or Firm* — Venable LLP

(57) ABSTRACT

Breakage of components is suppressed at the time of bonding. A print head with a metal film formed on laminated layers includes an electric wiring layer electrical connection with a metal film, a protective film covering and protecting the electric wiring layer, a groove separating the protective film and the electric wiring layer around the metal film, and a resin film applied to the groove.

10 Claims, 14 Drawing Sheets

(S1)

(S2)

(S3)

(S4)

(S5)

PRINT HEAD AND METHOD OF MANUFACTURING PRINT HEAD

BACKGROUND

Field of the Disclosure

The present disclosure relates to a print head and a method of manufacturing the print head.

Description of the Related Art

Japanese Patent Laid-Open No. 2009-905 discloses an inkjet print head (hereinafter referred to as "print head") wherein an electrical connecting pad (hereinafter also referred to as "electrode") is connected to a lead by a gang bonding method.

Electrodes of the print head require bump formation. In recent years, plating bumps have been mainly used to reduce the manufacturing process of the print head.

In the case of bonding leads to electrodes, in order to suppress breakage of components on a substrate, attention must be directed toward an impact load and the like at the time of contact of a bonding tool with the bumps via the leads.

To solve the above problem, a print head according to the present disclosure aims to suppress breakage of components at the time of bonding.

SUMMARY

To solve the above problem, the print head according to the present disclosure is a print head with a metal film formed on laminated layers, the print head comprising: an electric wiring layer electrical connection with the metal film; a protective film covering and protecting the electric wiring layer; a groove separating the protective film and the electric wiring layer around the metal film; and a resin film applied to the groove.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In order to facilitate the understanding of a configuration of an inkjet printing apparatus (hereinafter simply referred to as "printing apparatus") and print head according to the present embodiment, a general printing apparatus and print head will be explained first in the following description.

[General Printing Apparatus]

A general printing apparatus 100 (see FIG. 4) can perform high-density and high-speed printing for various print media S (such as paper and plastic sheets). Further, the recent printing apparatus 100 makes almost no noise in printing. As a typical ink ejection method for a print head 1000 mounted on the printing apparatus 100 which makes almost no noise in printing, there is known a method of heating ink by means of an electrothermal transducing element 1103 (see FIG. 7) comprising a heat resistor and ejecting ink droplets by the action of film boiling.

In the print head 1000 (see FIG. 4) with the electrothermal transducing element 1103, the electrothermal transducing element 1103 is provided in an ink chamber (not shown) and an electric pulse to be a print signal is supplied to the electrothermal transducing element 1103 to generate heat and provide ink with heat energy. In the above method, a bubble pressure at the time of ink bubble generation (boiling) produced by a phase change of ink in the case of providing ink with heat energy is used to eject minute ink droplets from minute ejection openings 1107 (see FIG. 7) and perform printing on a print medium S. In general, the printing apparatus 100 comprises an inkjet print nozzle for ejecting ink droplets and a supply system for supplying ink to the nozzle. The print head 1000 is provided with a heater, a substrate on which matrix wiring, driver, and the like are formed to drive the heater, and a nozzle formation material for forming the ejection openings 1107 and the like.

Figure 3:
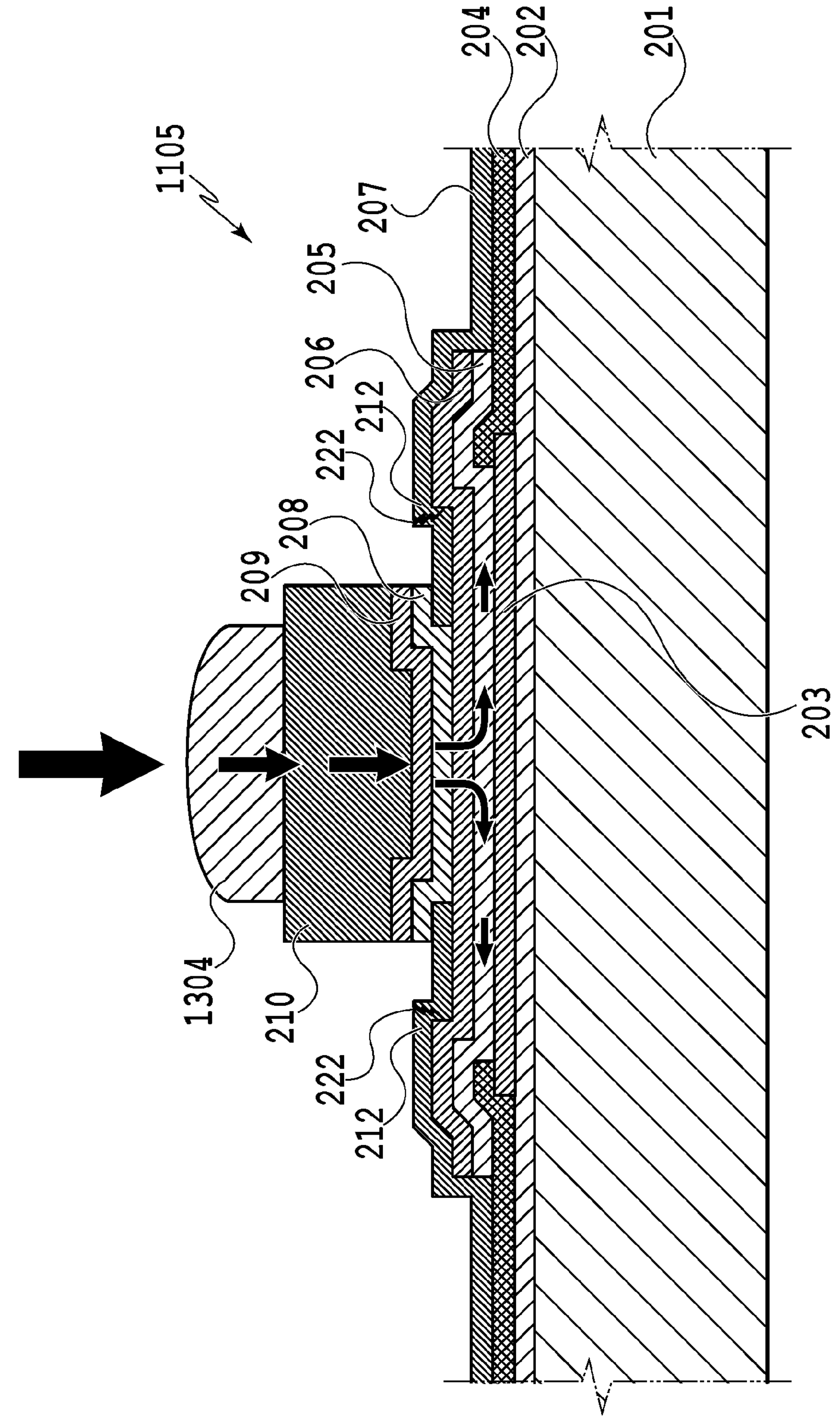
FIG. 3 is a schematic cross-sectional view of a general electrical connection portion.
Figure 4:
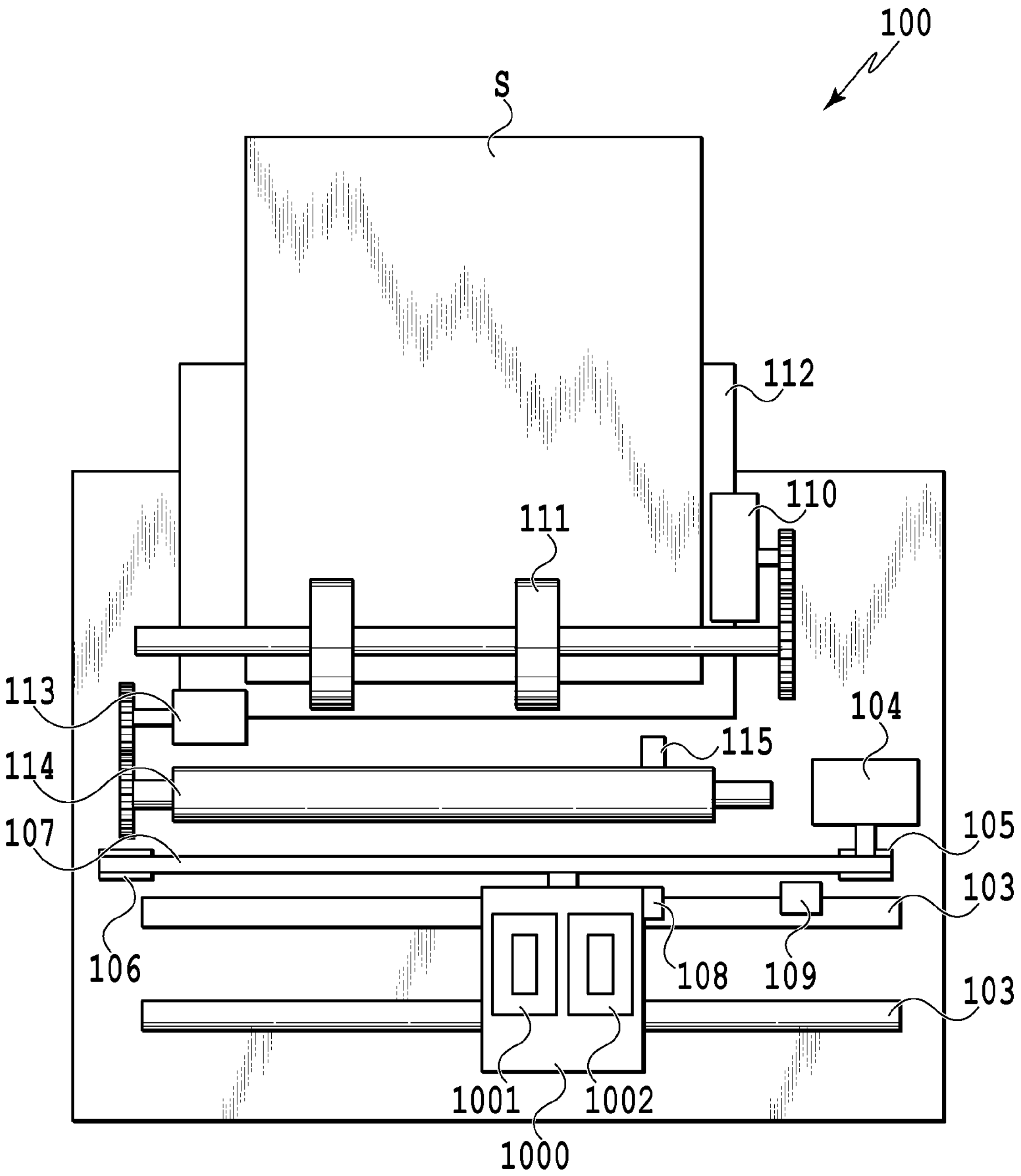
FIG. 4 is a schematic plan view showing an example of a printing apparatus.

In order to manufacture the print head 1000, it is necessary to electrically connect bumps formed on electrode terminals 1105 on a printing element substrate 1101 (see FIG. 7) to the printing apparatus 100 body (see FIG. 4). Accordingly, the manufacturing process of the print head 1000 includes the step of electrically connecting the bumps formed on the electrode terminals 1105 (see FIG. 7) to leads 1304 (see FIG. 3) connecting with the printing apparatus 100 body.

Incidentally, the number of nozzles has been recently increasing to improve a printing speed. In addition, from the viewpoint of a reduction of nozzle manufacturing costs, the size of the printing element substrate 1101 (see FIG. 7) is becoming increasingly smaller to increase the number of printing element substrates 1101 that can be attached to one wafer. Accordingly, the number of electrode terminals 1105 (i.e., the number of bumps) arranged in one wafer tends to increase. According to plating bumps formed by growing gold by an electrolytic plating method, since a plurality of bumps can be collectively formed per wafer, the unevenness of bump height can be suppressed. This is the end of the explanation of the general printing apparatus 100 and print head 1000.

[Configuration of the General Electrode Terminal 1105]

Figure 1:
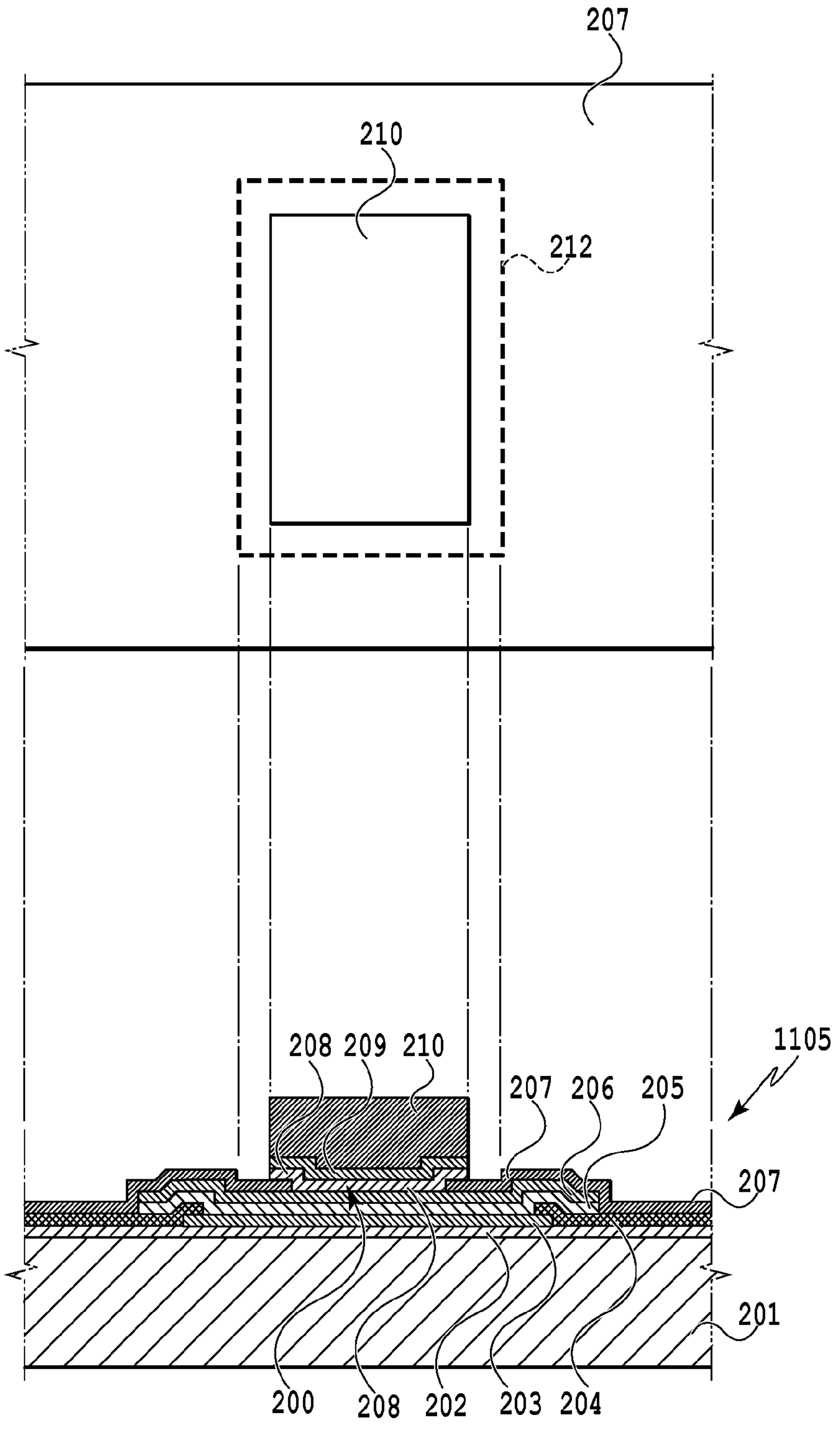
FIG. 1 is a schematic plan view and cross-sectional view of a general electrode terminal.
Figure 2A:
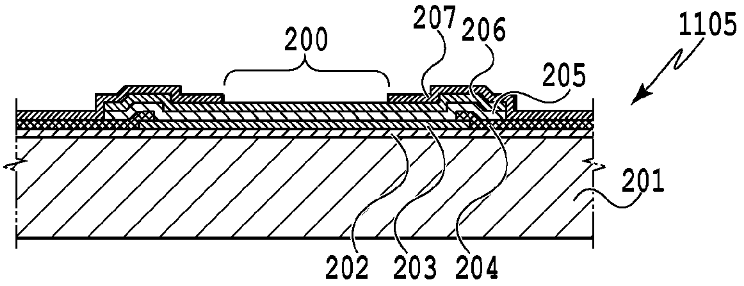
FIG. 2A to 2E are diagrams showing a manufacturing flow of the general electrode terminal.
Figure 2B:
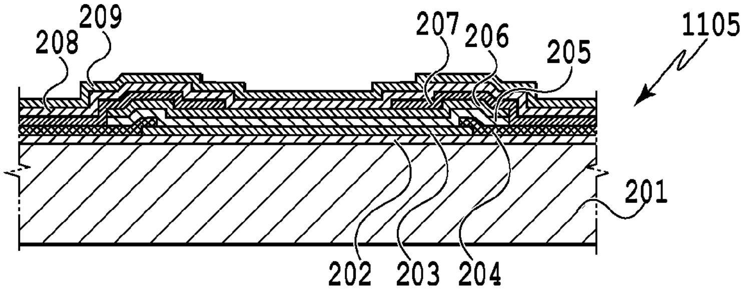
Figure 2C:
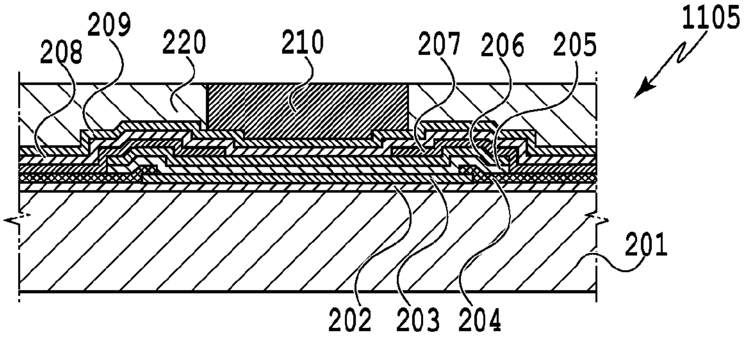
Figure 2D:
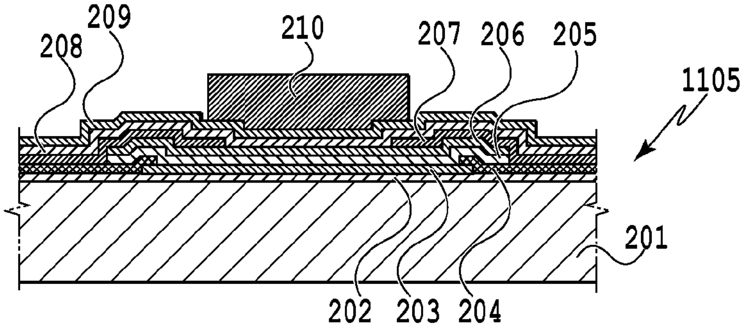
Figure 2E:
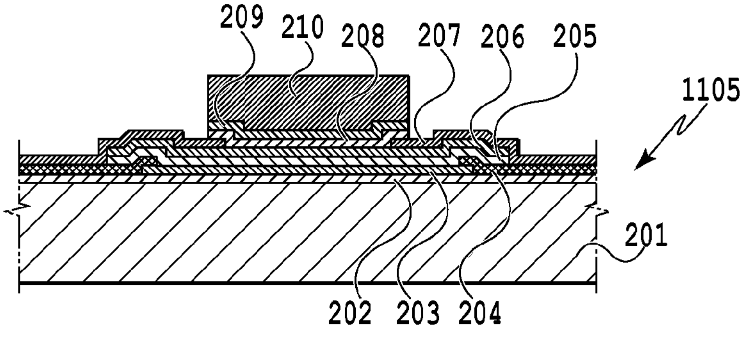

Next, a general electrode terminal 1105 will be described with reference to FIG. 1 to FIG. 3. FIG. 1 is a schematic plan view and cross-sectional view of the general electrode terminal 1105. As shown in FIG. 1, the general electrode terminal 1105 includes a heat storage layer 202, a first electric wiring layer 203, an interlayer insulating film 204, a heater film 205, a second electric wiring layer 206, a protective film 207, and a through hole 200, which are sequentially formed on a silicon substrate 201. A bent portion 212 is formed in the protective film 207.

On the protective film 207 and the through hole 200, an adhesion improving layer 208 and a plating conductor gold 209 are sequentially formed from below in the drawing. Incidentally, the adhesion improving layer 208 means a barrier metal layer. A resist 220 (see FIG. 2) is applied on the plating conductor gold 209 and a metal film 210 is formed within the resist 220.

[Manufacturing Flow of the General Electrode Terminal]

FIG. 2A to 2E are diagrams showing a manufacturing flow of the general electrode terminal 1105. In the description below, "S" indicates a step.

In S1, on the silicon substrate 201 are formed an IC film (not shown) such as a driver IC, a heat storage layer 202 including $SiO_2$, and a common electrode (not shown) for power supply in heater driving by the driver IC according to a drive signal. The above-mentioned IC film is formed using a semiconductor element for driving the heater at the time of ink ejection and includes, for example, about six layers. In this step, a first electric wiring layer 203, an interlayer insulating film 204 including SiO, a heater film 205 forming the heater, a second electric wiring layer 206 and a protective film 207 are sequentially formed. The first electric wiring layer 203 is formed using aluminum which forms a common electrode for grounding. The interlayer insulating film 204 covers the entire periphery of the first electric wiring layer 203. The second electric wiring layer 206 includes aluminum for directly connecting with the heater and supplying power. The protective film 207 includes a brittle material such as SiN or SiC to protect the wiring and heater. In this step, the protective film 207 is patterned by a photolithography technique to form a through hole 200 for electrical connection between the aluminum wiring and an external device.

In S2, an adhesion improving layer 208 is formed with a predetermined thickness over the entire surface by a vacuum deposition device or the like. For example, TiW which is a high melting point metal material can be used as the material for the adhesion improving layer 208. In this step, a plating conductor gold 209 excellent for use as wiring metal is formed with a predetermined thickness over the entire surface by a vacuum deposition device or the like.

In S3, a resist 220 is applied to the surface of the plating conductor gold 209 by a spin coating method and the resist 220 is exposed to light, developed, and the like by the photolithography technique. For example, as the resist 220, a negative resist 220 can be used. A current is fed through the plating conductor gold 209 by the electrolytic plating method, whereby gold is deposited on an area not covered with the resist 220 and a metal film 210, which is a thick film to be bumps, is formed within the resist 220.

In S4, the resist 220 is removed by being immersed in a stripping solution for the resist 220 for a predetermined period. After the resist 220 is removed and the plating conductor gold 209 is exposed, the plating conductor gold 209 is immersed in an etchant including potassium iodide and iodine including an organic nitrogen-based compound for a predetermined period to expose the adhesion improving layer 208.

In S5, the adhesion improving layer 208 is immersed in an $H_2O_2$-based etchant for a predetermined period to form a gold plating layer (plating bumps) including the plating conductor gold 209 for supplying drive power to aluminum wiring. Incidentally, the adhesion improving layer 208, the plating conductor gold 209, and the metal film 210 are formed to overlap the entire periphery of the protective film 207.

In the subsequent step, the metal film 210 on the printing element substrate 1101 is connected to leads 1304. A gang bonding method is one of general methods for connecting the leads 1304 to the printing element substrate 1101. In the gang bonding method, the leads 1304 are collectively bonded by thermal compression to the metal film 210 on the electrode terminals 1105 on the printing element substrate 1101. At this time, since all the leads 1304 are bonded by a wide bonding tool, bonding processing takt can be substantially the same irrespective of the number of leads 1304 according to the gang bonding method.

In the method of manufacturing the print head 1000 including the step of electrically connecting the printing element substrate 1101 to an electric wiring tape 1301 (see FIGS. 5A and 5B), an impact, vibration, and the like are made during conveyance, handling, and the like before the subsequent step of adhering and fixing to a base member. Accordingly, not a little load is applied to the electrical connection portion. More attention must be paid to this load as the printing element substrate 1101 is upsized, the number of electrode terminals 1105 is increased, the electrode terminal 1105 is downsized, and the pitch of the array of the electrode terminals 1105 is reduced.

In the gang bonding method, it is also necessary to pay heed to an electrical connection failure such as peeling and rupture. In order to suppress the electrical connection failure such as peeling and rupture, for example, the temperature of the bonding tool is managed as a bonding condition and attention is directed toward an impact load at the time of contact of the bonding tool with the metal film 210 via the leads 1304. In addition, a pressing load acting after the contact of the bonding tool with the metal film 210 via the leads 1304 is increased and the improvement of strength of connection between the metal film 210 and the leads 1304 is encouraged. Incidentally, although FIG. 2 shows the film state of the electrode terminal 1105 in each step, a film structure and the like in all of the heater, the through hole 200, and the substrate are simultaneously formed by some of the steps shown in FIG. 2 as a matter of course. This is the end of the manufacturing flow of the general electrode terminal 1105.

[Generation of Cracks 222]

In the bonding method for electrically connecting the metal film 210 to the leads 1304, a pressure (impact load, pressing load) is applied to the metal film 210 and the leads 1304 by the bonding tool. Accordingly, there is a case where the bent portion 212 of the protective film 207 outside the edge of the metal film 210 is broken and cracks 222 (see FIG. 3) are generated. A description will be given of the process in which the protective film 207 is broken and the cracks 222 are generated.

FIG. 3 is a schematic cross-sectional view of a general electrical connection portion. As described above, a pressure is applied to the metal film 210 and the lead 1304 by the bonding tool. The lead 1304 and the metal film 210 are crushed by the pressure applied to the metal film 210 by the bonding tool.

The first electric wiring layer 203 and the second electric wiring layer 206, which are formed of aluminum under the metal film 210 immediately below the lead 1304, are also crushed by the pressure applied to the metal film 210 by the bonding tool. On the other hand, the material used for the heat storage layer 202 and the silicon substrate 201 formed under the first electric wiring layer 203 is more rigid than aluminum. Thus, the heat storage layer 202 and the silicon substrate 201 will never be crushed by the pressure applied to the metal film 210 by the bonding tool.

The metal film 210, the first electric wiring layer 203, and the second electric wiring layer 206 crushed by the pressure applied by the bonding tool move toward the protective film 207 located outside the crashed area. At this time, the protective film 207, which is formed above the second electric wiring layer 206 and below the metal film 210 and is in intimate contact with the second electric wiring layer 206 and the metal film 210, also moves following the movement of the second electric wiring layer 206 and the metal film 210. As a result, a stress is concentrated at the bent portion 212 of the protective film 207 located outside the edge of the metal film 210 and the cracks 222 may be generated in the protective film 207.

In addition, in a case where the pressure at the time of bonding is increased in order to suppress the electrical connection failure such as peeling and rupture, the size and number of cracks 222 generated in the protective film 207 tend to increase. If the cracks 222 are generated at the bent portion 212 of the protective film 207, moisture such as ink enters from the cracks 222, which may cause corrosion of the first electric wiring layer 203 and the second electric wiring layer 206 including aluminum and covered with the protective film 207. In the manufacturing process of the print head 1000, a first sealing agent 1307 and a second sealing agent 1308 (see FIG. 5) are applied to the electrical connection portion to protect the electrical connection portion against moisture such as ink.

However, there is a possibility that moisture absorbed into the first sealing agent 1307 and the second sealing agent 1308 enters from the cracks 222 and causes corrosion of the first electric wiring layer 203 and the second electric wiring layer 206. This is the end of the explanation of generation of the cracks 222.

[Inkjet Printing Apparatus]

FIG. 4 is a schematic plan view showing an example of a printing apparatus 100 according to the present embodiment. The printing apparatus 100 according to the present embodiment comprises a print head 1000. The print head 1000 comprises a first print head 1001 and a second print head 1002. Further, there are provided a carriage 102, a guide shaft 103, a main scanning motor 104, a motor pulley 105, a driven pulley 106, and a timing belt 107. There are also provided a home position sensor 108, a shield plate 109, a sheet feeding motor 110, pickup rollers 111, an auto sheet feeder 112, a conveying motor 113, a conveying roller 114, and a sheet end sensor 115.

The printing apparatus 100 according to the present embodiment comprises the carriage 102 on which the print head 1000 is positioned and exchangeably mounted. The carriage 102 is provided with an electrical connection portion for transferring a drive signal and the like to each ejection portion 1108 (see FIG. 7) to be described later via external signal connection terminals 1302 on the print head 1000.

The carriage 102 is supported so as to reciprocally move along the guide shaft 103 extending in a main scanning direction and provided in the printing apparatus 100 body. The carriage 102 is driven and its position and movement are controlled by the main scanning motor 104 via driving mechanisms such as the motor pulley 105, the driven pulley 106, and the timing belt 107. The carriage 102 also comprises the home position sensor 108. A position to be a home position is detected in a case where the home position sensor 108 of the carriage 102 passes by the position of the shield plate 109. A print medium S is separately fed one by one from the auto sheet feeder 112 by the sheet feeding motor 110 rotating the pickup rollers 111 via a gear.

Further, the conveying motor 113 drives the conveying roller 114 via a gear and the conveying roller 114 is rotated. By the rotation of the conveying roller 114, the print medium S is conveyed (sub-scan) through a position (print area) facing surfaces of the first print head 1001 and second print head 1002 on which ejection openings 1107 (see FIG. 7) are formed. The surface on which the ejection openings 1107 are formed will be hereinafter referred to as "ejection opening surface." Whether the print medium S is fed is determined and the position of the front edge of the print medium S at the time of sheet feeding is determined at the time when the print medium S passes by the sheet end sensor 115. The sheet end sensor 115 is also used to detect an actual position of the rear end of the print medium S and finally calculate a current print position from the actual rear end. Incidentally, the back surface of the print medium S is supported by a platen (not shown) such that a flat print surface is formed in the print area. In this case, the print head 1000 mounted on the carriage 102 is held such that the ejection opening surface thereof protrudes downward from the carriage 102 and is parallel to the print medium S and the print area is subjected to a main scan.

The print head 1000 is mounted on the carriage 102 such that an array direction of the ejection openings 1107 in each ejection portion 1108 is a direction (e.g., sub-scanning direction) intersecting with the main scanning direction of the carriage 102. Ink is ejected from the ejection opening array during the main scan, thereby performing printing of a width corresponding to the ejection opening array range. The print head 1000 of the present embodiment is configured integrally with an ink tank and comprises an ink storage portion filled with a black ink and the first print head 1001 with an ejection portion 1108 which ejects the black ink supplied from the ink storage portion.

The print head 1000 described above also comprises ink storage portions filled with color inks, respectively, and the second print head 1002 with ejection portions 1108 which eject the color inks supplied from the respective ink storage portions. Examples of the color inks include a cyan ink, magenta ink, and yellow ink. The first print head 1001 and the second print head 1002 are fixed and supported on the carriage 102 by a positioning means and an electrical connection and have the form of cartridges attachable to and detachable from the carriage 102. In a case where the filled inks are totally consumed, the print head 1000 can be exchanged.

[Configuration of the Print Head 1000]

Out of the print head 1000 according to the present embodiment, a basic configuration of the second print head 1002 will be described below with reference to FIG. 5A to FIG. 8. Since the first print head 1001 shown in FIG. 4 has the same configuration as the second print head 1002 except that the configuration is for a single black ink, the description thereof will be omitted.

Figure 5A:
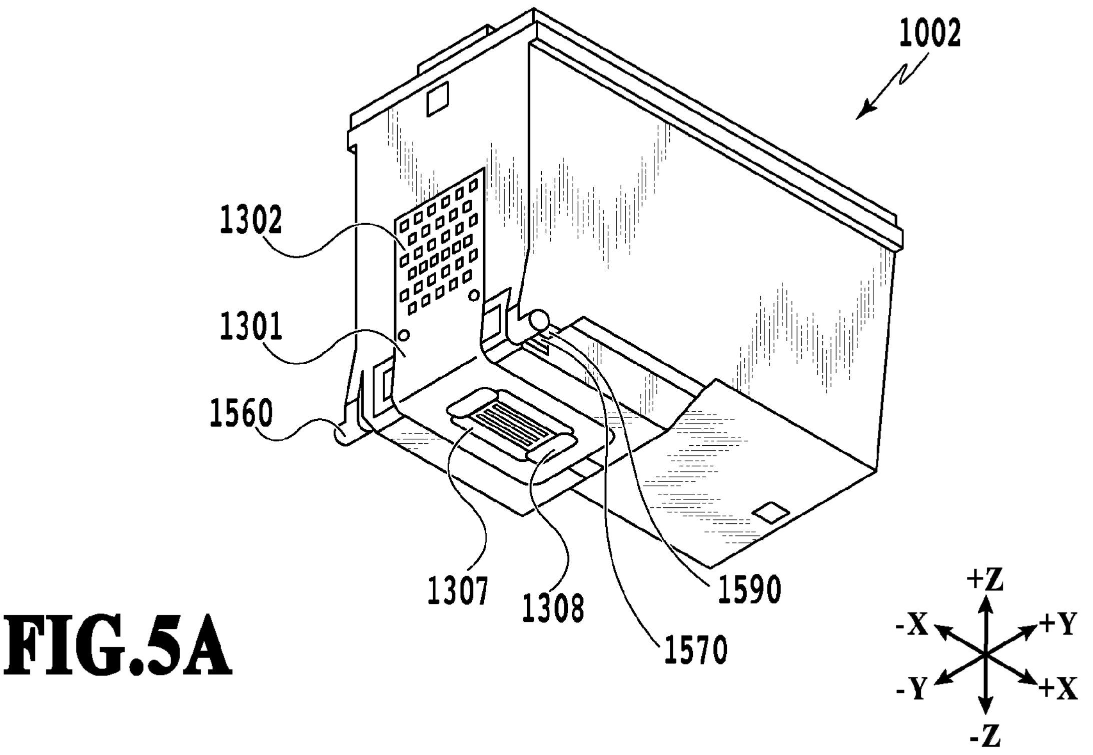
FIGS. 5A and 5B are perspective views showing a configuration example of a second print head.
Figure 5B:
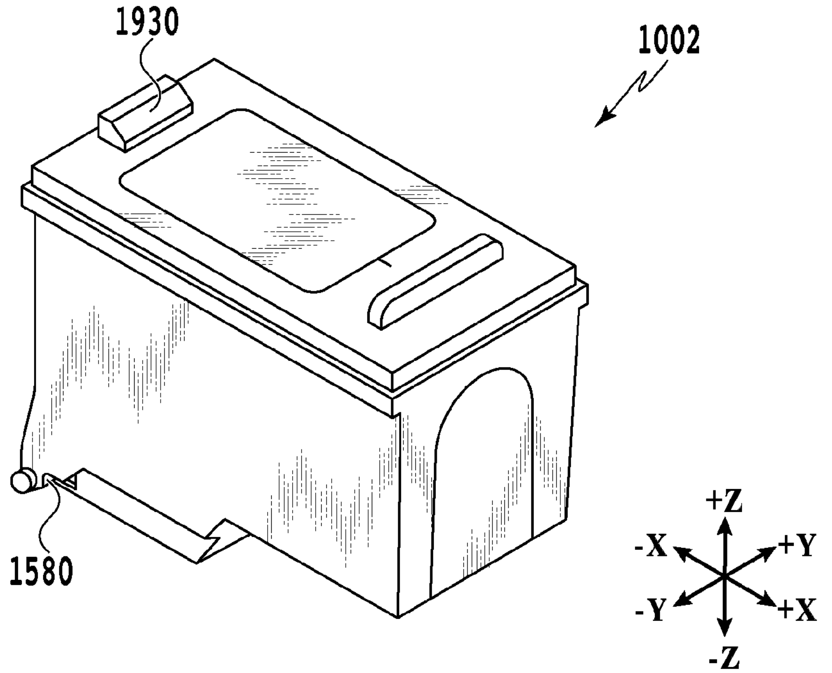

FIGS. 5A and 5B are perspective views showing a configuration example of the second print head 1002 according to the present embodiment. As shown in FIGS. 5A and 5B, the second print head 1002 comprises an electric wiring tape 1301, an external signal connection terminal 1302, a first sealing agent 1307, and a second sealing agent 1308. The second print head 1002 also comprises a mount guide 1560, an abutting portion 1570 in the main scanning direction (X direction), an abutting portion 1580 (see FIG. 5B) in the sub-scanning direction (Y direction), and an abutting portion 1590 in a vertical direction (Z direction). The second print head 1002 further comprises an engagement portion 1930 (see FIG. 5B).

Figure 6A:
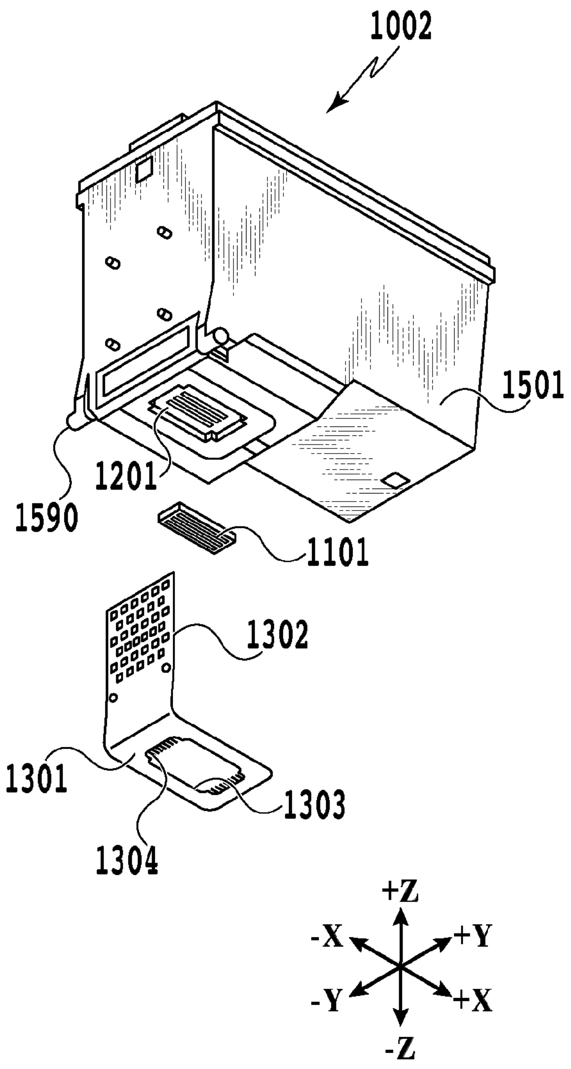
FIGS. 6A and 6B are exploded perspective views of the second print head.
Figure 6B:
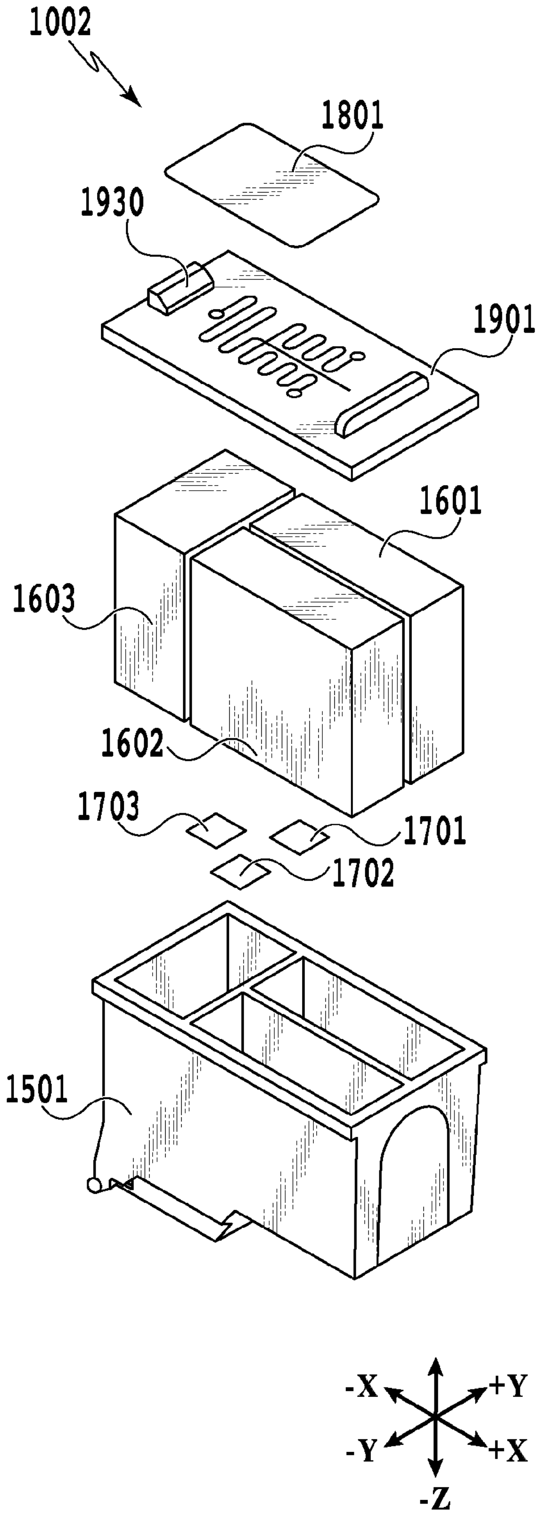

FIGS. 6A and 6B are exploded perspective views of the second print head 1002 according to the present embodiment. As shown in the exploded perspective views of FIGS. 6A and 6B, the second print head 1002 comprises a printing element substrate 1101, an opening portion 1303, leads 1304, and a body member 1501 as a support member besides the configuration shown in FIGS. 5A and 5B. The second print head 1002 also comprises a first ink absorber 1601, a second ink absorber 1602, and a third ink absorber 1603. The second print head 1002 further comprises a first filter 1701, a second filter 1702, a third filter 1703, a sealing member 1801, a cover member 1901, and an engagement portion 1930.

The second print head 1002 comprises the mount guide 1560 (see FIGS. 5A and 5B) for guidance to the mount position of the carriage 102 of the printing apparatus 100 body. The second print head 1002 is mounted and fixed on the carriage 102 by a fixing lever (not shown) provided on the carriage 102. The second print head 1002 also comprises the engagement portion 1930 for mounting and fixing on the carriage 102. The second print head 1002 is further equipped with the abutting portion 1570 in the main scanning direction (X direction), the abutting portion 1580 in the sub-scanning direction (Y direction), and the abutting portion 1590 in the vertical direction (Z direction) for positioning at the predetermined mount position of the carriage 102. The second print head 1002 is positioned on the carriage 102 by the abutting portion 1570 in the main scanning direction, the abutting portion 1580 in the sub-scanning direction, and the abutting portion 1590 in the vertical direction. This enables electrical connection between the external signal connection terminals 1302 on the electric wiring tape 1301 and contact pins of the electrical connection portion provided in the carriage 102. As described above, the second print head 1002 can eject inks of three colors: cyan, magenta, and yellow.

Figure 7:
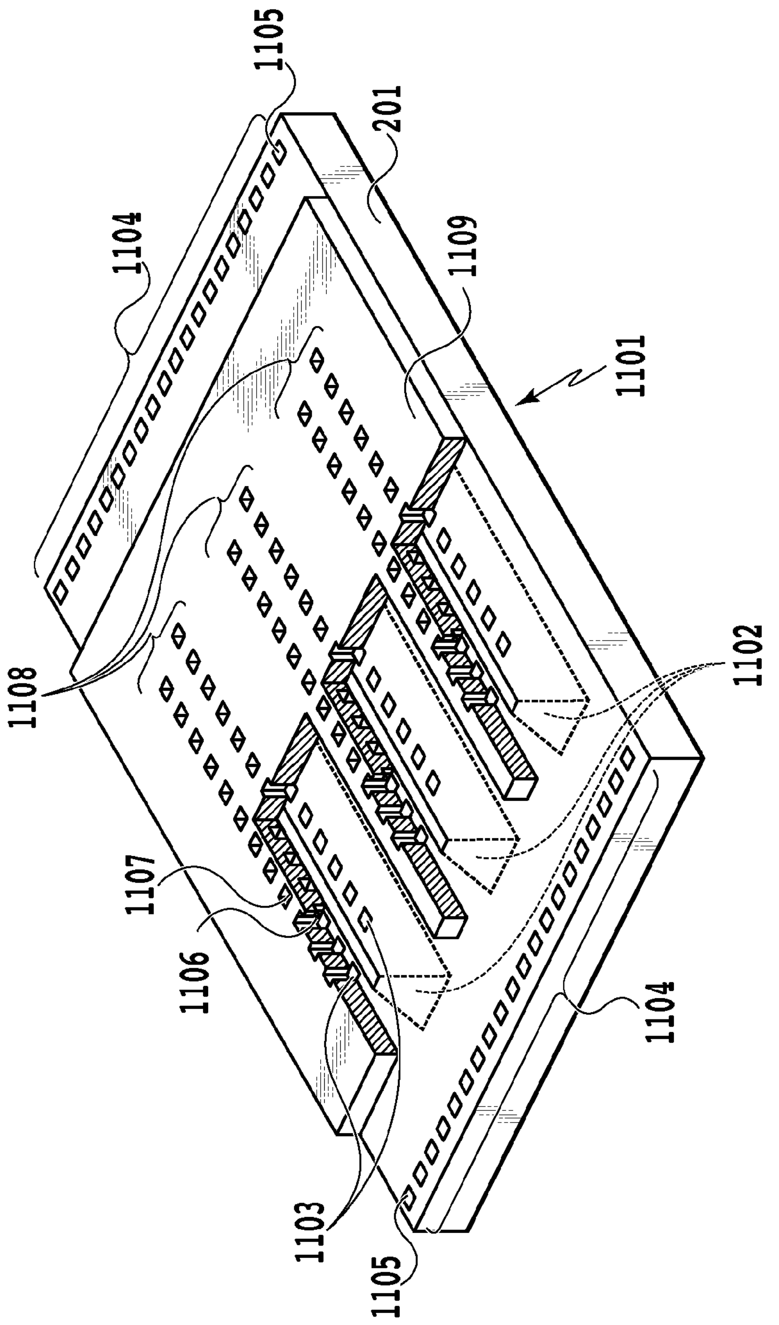
FIG. 7 is a partial cutaway perspective view of a printing element substrate.

FIG. 7 is a partial cutaway perspective view of the printing element substrate 1101. The printing element substrate 1101 according to the present embodiment comprises electrothermal transducing elements 1103 which generate heat energy for causing film boiling in ink according to an electrical signal. The electrothermal transducing elements 1103 and the ejection openings 1107 are arranged so as to face each other and ink is ejected in a direction vertical to the main face of the printing element substrate 1101. In short, the printing element substrate 1101 according to the present embodiment is a so-called side-shooter type substrate.

As shown in FIG. 7, the printing element substrate 1101 comprises a silicon substrate 201. On the silicon substrate 201 are provided ink supply openings 1102, electrothermal transducing elements 1103, electrode portions 1104, electrode terminals 1105, ink channel walls 1106, ejection openings 1107, ejection portions 1108, and an ejection opening forming member 1109. On the silicon substrate 201, the three slit-like ink supply openings 1102 for the respective color inks of cyan, magenta, and yellow are formed in parallel. On both sides of each of the ink supply openings 1102, the electrothermal transducing elements 1103 are arranged in an array to generate heat energy for causing film boiling in ink according to an electrical signal. The electrothermal transducing elements 1103 of one array are displaced from those of the other array by half the array pitch in the array direction (i.e., the sub-scanning direction).

The ink channel walls 1106 and the ejection openings 1107 are formed by the photolithography technique. The ejection portion 1108 of each color is formed by aligning the ejection openings 1107 with the respective electrothermal transducing elements 1103. The ejection opening forming member 1109 with the ejection portions 1108 formed therein is joined to the printing element substrate 1101. On the silicon substrate 201 are formed electric wiring made of aluminum or the like to supply power to the electrothermal transducing elements 1103, a fuse, and the electrothermal transducing elements 1103 according to print data. A logic circuit to drive the printing apparatus 100, the electrode portions 1104 to electrically connect each of the portions to an external device, and the like are also formed. Further, the electrode portions 1104 has the electrode terminals 1105 in the form of plating bumps of Au or the like. Incidentally, the electrothermal transducing elements 1103 and the like can be formed using an existing film deposition technique.

The electric wiring tape 1301 (see FIGS. 6A and 6B), which is an electric wiring member, forms an electric signal path to apply an electric signal for ink ejection to the printing element substrate 1101. The electric wiring tape 1301 has the opening portion 1303 (see FIGS. 6A and 6B) to incorporate the printing element substrate 1101. The leads 1304 to be connected to the electrode portions 1104 of the printing element substrate 1101 are formed to protrude from the edge of the opening portion 1303. On the electric wiring tape 1301, the external signal connection terminals 1302 are formed to receive an electric signal from the printing apparatus 100 body. The leads 1304 and the external signal connection terminals 1302 are connected by a conductive wiring pattern including a continuous copper foil and the like.

The electric wiring tape 1301 is formed using a TAB tape. On the other hand, the leads 1304 are exposed and formed as flying leads. As to the connection between the electric wiring tape 1301 and the printing element substrate 1101, the metal film 210 formed in the electrode terminals 1105 and the leads 1304 of the electric wiring tape 1301 corresponding to the electrode terminals 1105 are electrically connected to each other by the gang bonding method.

Figure 8:
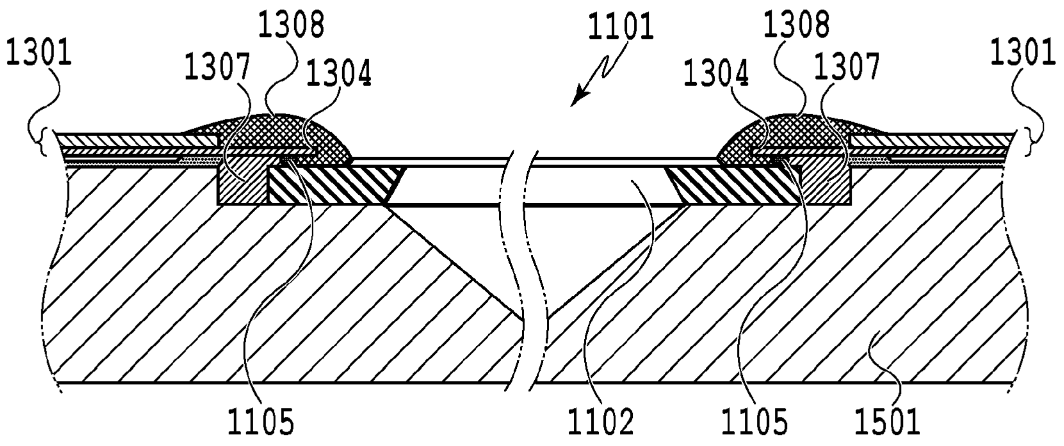
FIG. 8 is a partial cross-sectional view of the print head showing a sealed state of the electrical connection portion.

FIG. 8 is a partial cross-sectional view of the print head 1000 showing a sealed state of the electrical connection portion. As shown in FIG. 8, the electrical connection portion between the printing element substrate 1101 and the electric wiring tape 1301 is sealed with the first sealing agent 1307 and the second sealing agent 1308. The electrical connection portion can be thus protected against corrosion by moisture such as ink and external impact. The first sealing agent 1307 mainly seals the back side of the connection portion between the lead 1304 of the electric wiring tape 1301 and the electrode terminal 1105 of the printing element substrate 1101 and the outer periphery of the printing element substrate 1101. The second sealing agent 1308 seals the front side of the electrical connection portion.

[Configuration of the Electrode Terminal 1105 According to the Present Embodiment]

The configuration of the electrode terminal 1105 according to the present embodiment will be described with reference to the drawings. It should be noted that even if examples are explained, the technique according to the present disclosure is not limited to these examples. It should also be noted that the features of the printing apparatus 100 and print head 1000 according to the present embodiment identical or corresponding to those of the general printing apparatus 100 and print head 1000 will be described with the same names and reference numerals.

Figure 9:
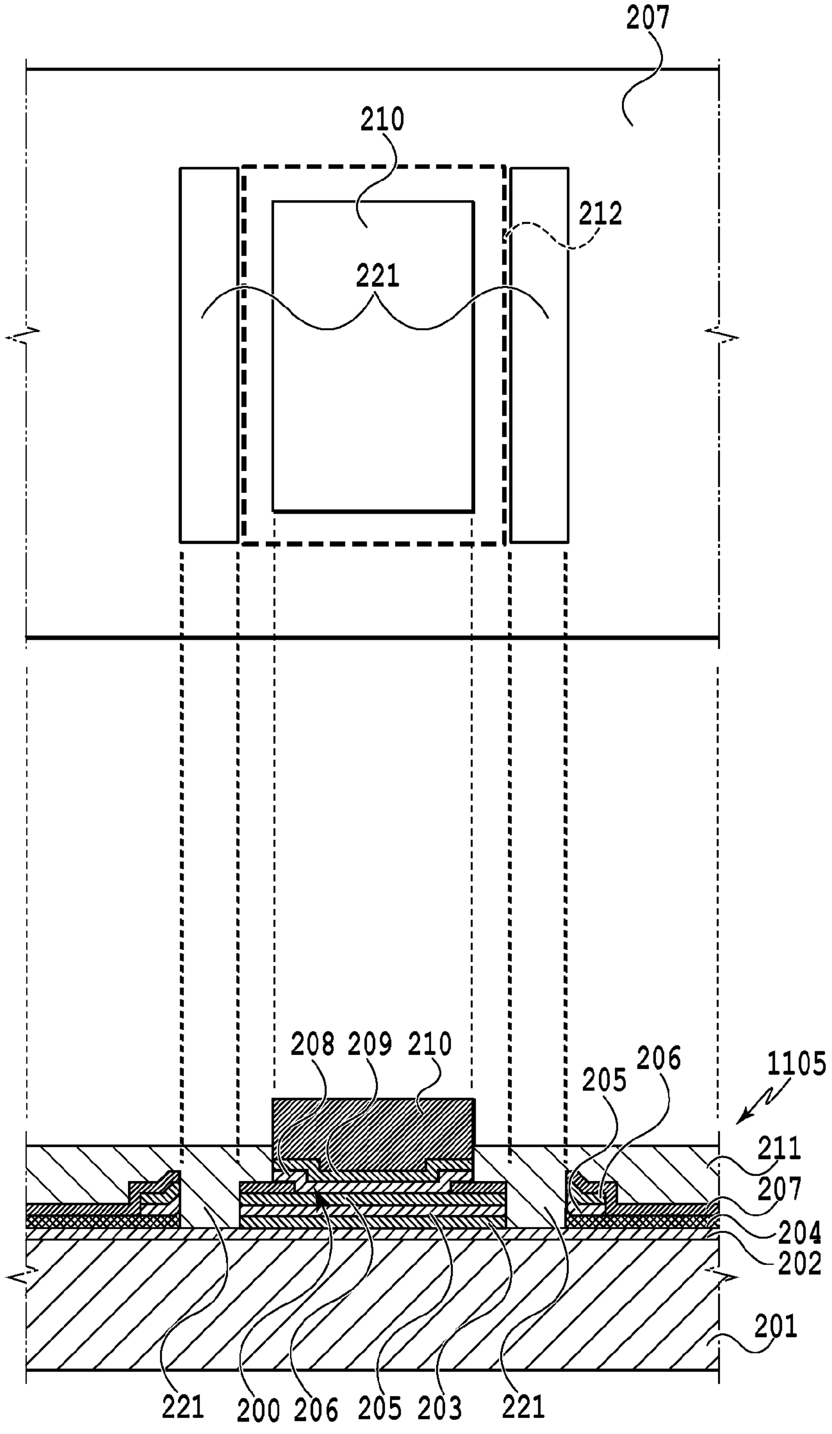
FIG. 9 is a schematic view of a substrate cross section of an electrode terminal and a top surface of the electrode terminal.
Figure 10A:
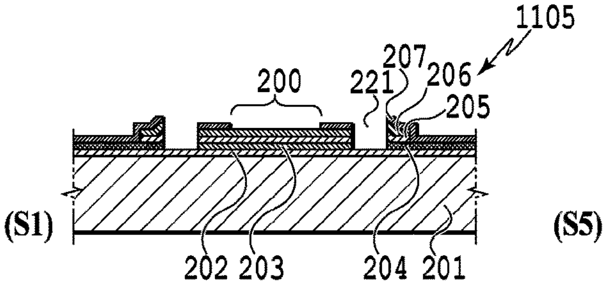
FIGS. 10A to 10H are diagrams showing a manufacturing flow of the electrode terminal.
Figure 10B:
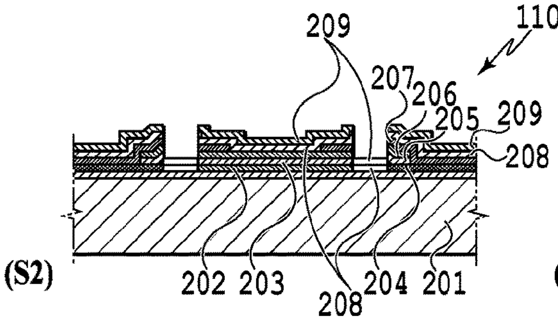
Figure 10C:
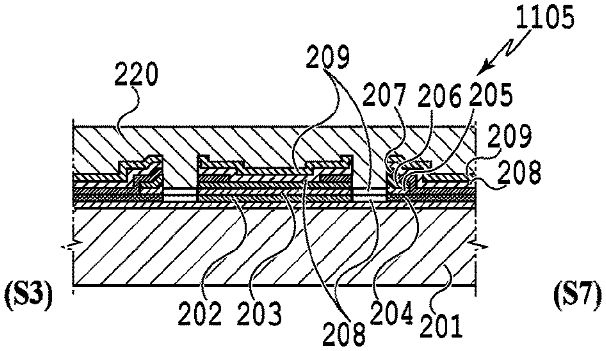
Figure 10D:
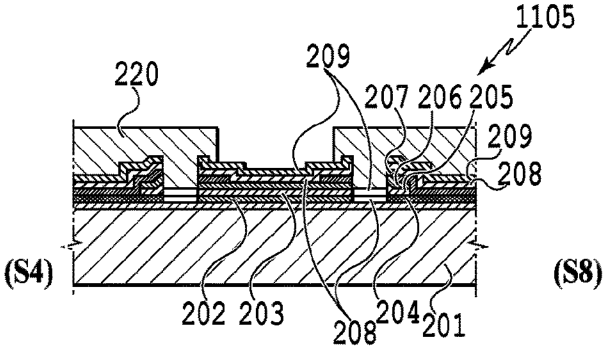
Figure 10E:
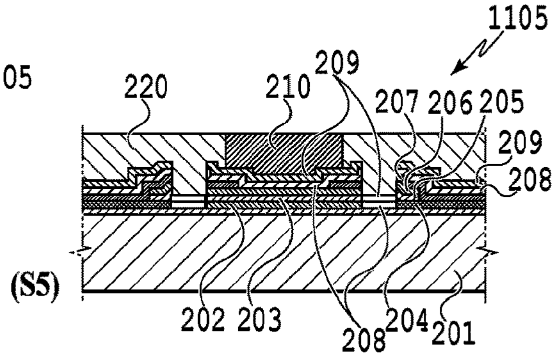
Figure 10F:
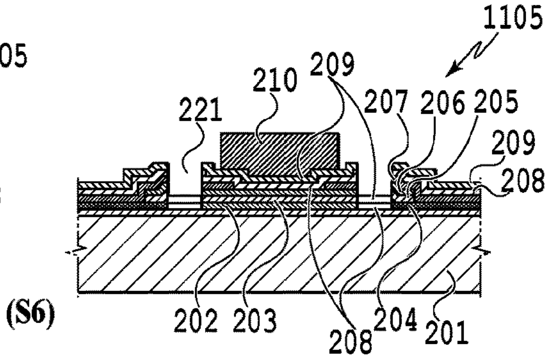
Figure 10G:
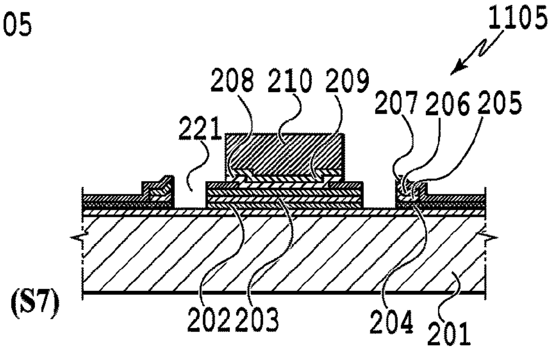
Figure 10H:
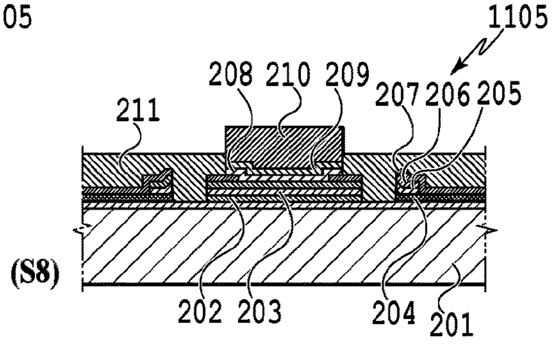

FIG. 9 shows a schematic view of a substrate cross section of the electrode terminal 1105 according to the present embodiment and a top surface of the electrode terminal 1105. The heat storage layer 202, the first electric wiring layer 203, the interlayer insulating film 204, the heater film 205, the second electric wiring layer 206, and the protective film 207 are sequentially formed on the silicon substrate 201. The interlayer insulating film 204 is formed to cover the entire periphery of the first electric wiring layer 203. An opening is made in the protective film 207 by patterning to form the through hole 200 which establishes electrical connection between the electric wiring and an external device. In the through hole 200, a gold thick film (hereinafter referred to as "metal film 210") to be bumps is formed by the electrolytic plating method via the adhesion improving layer 208 of TiW or the like formed as an undercoat layer and the plating conductor gold 209. The shape of the metal film 210 is substantially rectangular in a plan view. The metal film 210 is electrical connection with the first electric wiring layer 203 and the second electric wiring layer 206. That is, the first electric wiring layer 203 and the second electric wiring layer 206 are formed below the metal film 210 and are electrical connection with the metal film 210.

In the present embodiment, before the formation of the gold plating bumps (i.e., the metal film 210), a groove 221 is formed to separate the protective film 207, the first electric wiring layer 203, and the second electric wiring layer 206 around the electrical connection portion and a resin film 211 is embedded in the groove 221. That is, the groove 221 separates the protective film 207, the first electric wiring layer 203, and the second electric wiring layer 206 around the metal film 210. Further, the resin film 211 is embedded in the groove 221. If the bent portion 212 of the protective film 207 is exposed like the general electrode terminal 1105 (see FIG. 3), cracks 222 may occur in the bent portion 212 at the time of collectively joining the leads 1304 by the gang bonding method.

However, according to the electrode terminal 1105 of the present embodiment, even in a case where the pressure is applied to the metal film 210 by bonding, the formed groove 221 suppresses the first electric wiring layer 203 and the second electric wiring layer 206 from moving following the movement of the metal film 210. As a result, the stress imposed on the protective film 207 can be reduced.

Since the deformation of the first electric wiring layer 203 and the second electric wiring layer 206 is suppressed, the bending of the protective film 207 is also suppressed and the occurrence of the cracks 222 can be reduced. In addition, even on the occurrence of the cracks 222 in the protective film 207, the resin film 211 is embedded in the groove 221 and portions with the cracks 222 are protected by the resin film 211. This can suppress corrosion of the aluminum wiring caused by moisture such as ink entering from the cracks 222 and also suppress corrosion of the aluminum wiring caused by moisture absorbed into the first sealing agent 1307 and the second sealing agent 1308.

[Method of Forming the Electrode Terminal 1105 According to the Present Embodiment]

Next, the method of forming the electrode terminal 1105 according to the present embodiment will be described with reference to FIGS. 10A to 10H. FIGS. 10A to 10H are diagrams showing a manufacturing flow of the electrode terminal 1105 according to the present embodiment.

Incidentally, as to the features identical or corresponding to those of the general electrode terminal 1105 described above with reference to FIG. 2, description will be omitted as appropriate.

In S1, the above-described IC film (not shown), heat storage layer 202, first electric wiring layer 203, interlayer insulating film 204, heater film 205, second electric wiring layer 206, and protective film 207 are sequentially formed from below on the silicon substrate 201. That is, the first electric wiring layer 203 and the second electric wiring layer 206 to be electrical connection with the metal film 210 are formed in this step. In other words, this step includes the process of forming the first electric wiring layer 203 and the second electric wiring layer 206 to be located below the metal film 210 and electrical connection with the metal film 210. After that, the protective film 207 is patterned by the photolithography technique to form the through hole 200 which establishes electrical connection between the aluminum wiring and an external device. In the present embodiment, after the patterning of the protective film 207, the photolithography technique is also used to form the groove 221 which separates the laminated protective film 207, first electric wiring layer 203, and second electric wiring layer 206 around the electrical connection portion. That is, the groove 221 is formed by the photolithography.

In S2, the above-described adhesion improving layer 208 is formed with a predetermined thickness over the entire surface by a vacuum deposition device or the like. The plating conductor gold 209 excellent for use as wiring metal is then formed with a predetermined thickness over the entire surface by a vacuum deposition device or the like.

In S3, the resist 220 is applied to the surface of the plating conductor gold 209 by the spin coating method. For example, a negative resist 220 can be used.

In S4, the resist 220 is exposed to light, developed, and the like by the photolithography technique.

In S5, a predetermined current is fed through the plating conductor gold 209 by the electrolytic plating method, gold is deposited on a predetermined area not covered with the resist 220, and the metal film 210, which is a thick film to be bumps, is formed within the resist 220.

In S6, the resist 220 is removed by being immersed in a stripping solution for the resist 220 for a predetermined period and the plating conductor gold 209 is exposed.

In S7, the plating conductor gold 209 is immersed in an etchant including potassium iodide and iodine including an organic nitrogen-based compound for a predetermined period and the plating conductor gold 209 is removed by etching. After that, the adhesion improving layer 208 is immersed in an $H_2O_2$-based etchant for a predetermined period, whereby plating bumps for supplying drive power to the aluminum wiring are formed of the gold plating layer formed from the plating conductor layer.

In S8, the resin film 211 is applied to the surface of the protective film 207 by the spin coating method and the resin film 211 is heated and cured. Examples of the material for the resin film 211 include polyether amide resin, acrylic resin, cyclized rubber, and epoxy resin. For example, a negative resist 220 is applied to the surface of the resin film 211 by the spin coating method and the resist 220 is exposed to light, developed, and patterned by the photolithography technique. At this time, as shown in S8 in the drawing, the resin film 211 is formed so as to fill the groove 221 which separates the protective film 207, first electric wiring layer 203, and second electric wiring layer 206 around the electrical connection portion. The resin film 211 is also arranged and formed to cover the protective film 207 around the electrical connection portion.

Figure 11:
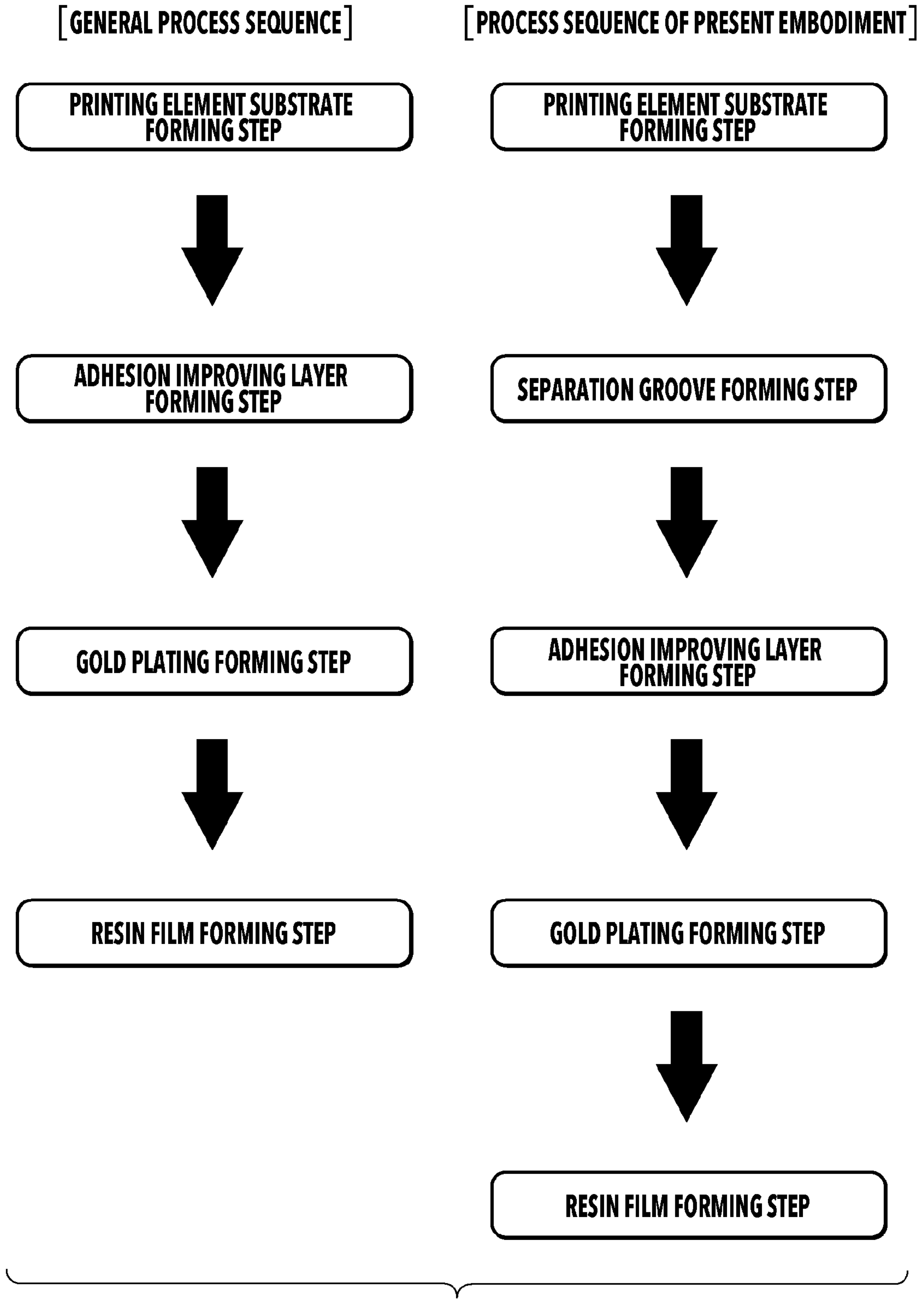
FIG. 11 is a diagram showing a process sequence for the general electrode terminal and a process sequence for the electrode terminal according to the present embodiment.

FIG. 11 is a diagram showing a process sequence for the general electrode terminal 1105 and a process sequence for the electrode terminal 1105 according to the present embodiment. As shown in FIG. 11, the general process sequence is in the order of a printing element substrate forming step, an adhesion improving layer forming step, a gold plating forming step, and a resin film forming step. In contrast, the process sequence of the present embodiment is in the order of a printing element substrate forming step, a separation groove forming step, an adhesion improving layer forming step, a gold plating forming step, and a resin film forming step. That is, the process sequence of the present embodiment is different from the general one in that the separation groove forming step is added after the printing element substrate forming step.

[Formation Position of the Groove 221]

Figure 12A:
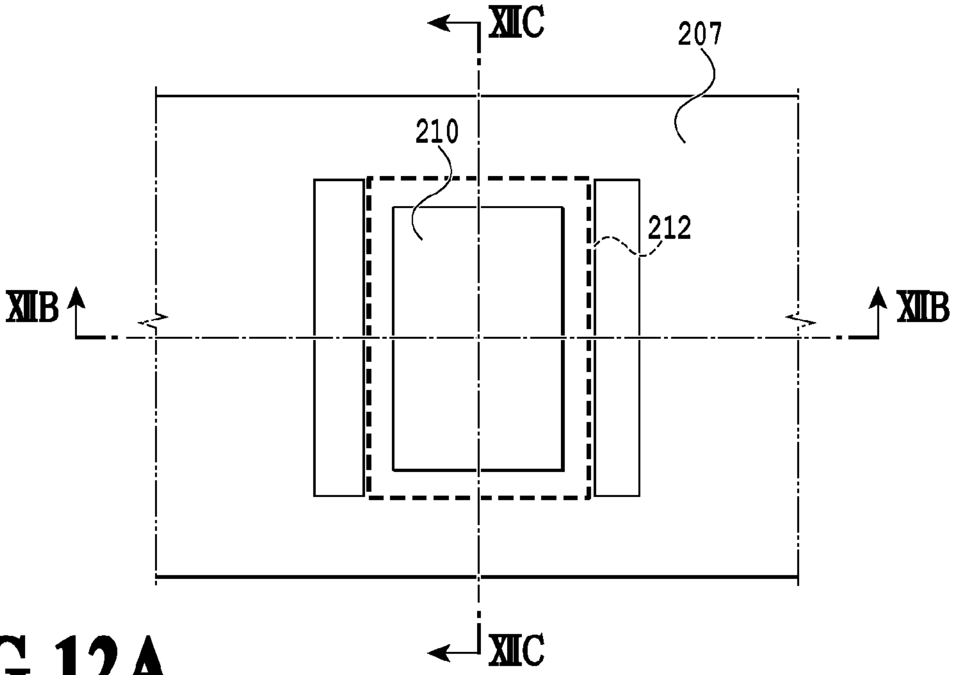
FIGS. 12A to 12C are diagrams showing an example of a formation position of a groove.
Figure 12B:
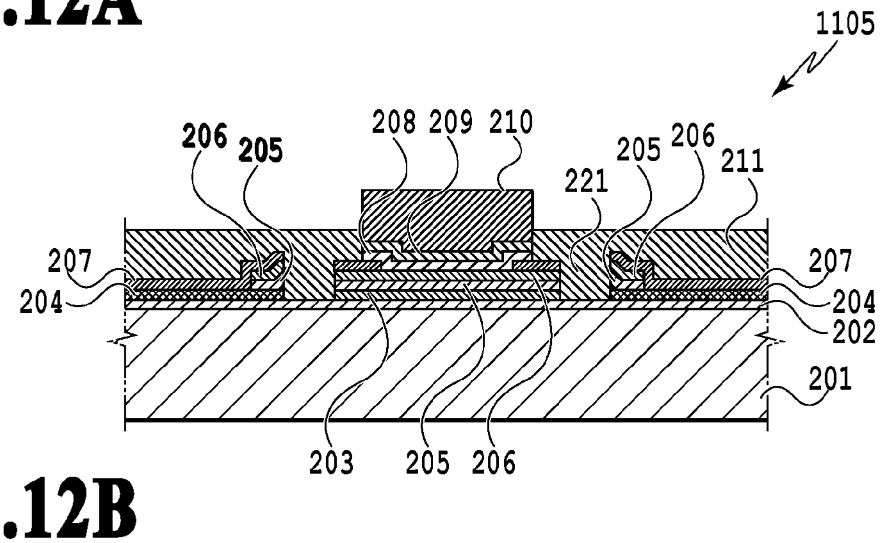
Figure 12C:
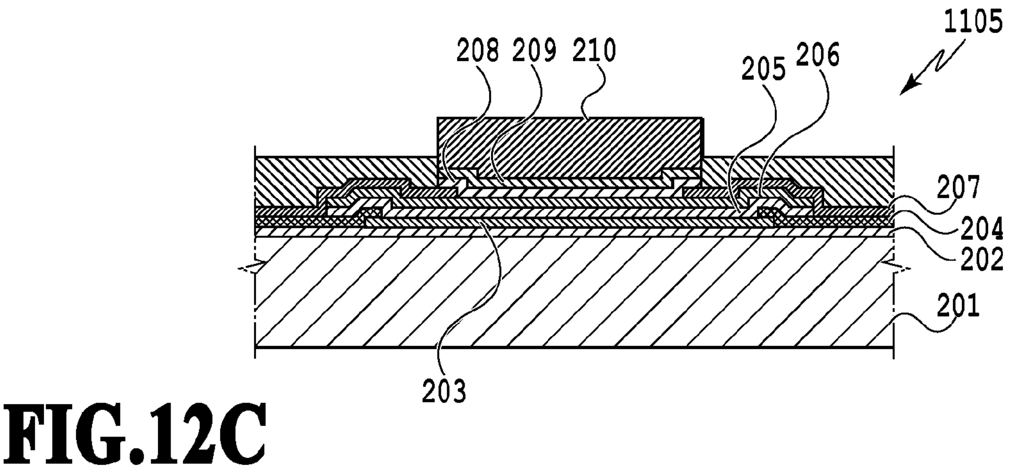

FIGS. 12A to 12C are diagrams showing an example of a formation position of the groove 221. FIG. 12A is a schematic plan view of the electrical connection portion according to the present embodiment. FIG. 12B is a cross-sectional view along XIIb-XIIb line in FIG. 12A. FIG. 12C is a cross-sectional view along XIIc-XIIc line in FIG. 12A. As shown in FIG. 12A, by forming the grooves 221 around the electrical connection portion, the stress can be reduced at the time of bonding and the cracks 222 can be suppressed from occurring in the protective film 207. On the other hand, in order to ensure electrical connection, it is necessary to partially reserve an area with no groove 221. In other words, the formation position of the groove 221 in the protective film 207 is not limited unless the edge of the electrical connection portion is entirely surrounded by the groove 221. For example, as shown in FIG. 12B, an area with no groove 221 may be reserved on the short edges of the electrical connection portion. In the example shown in FIG. 12A, the electrical connection portion is designed to be rectangular and the long edges of the metal film 210 have less room than the short edges. Accordingly, in a case where the leads 1304 are collectively joined by the gang bonding method, the cracks 222 tend to appear in the bent portion 212 of the protective film 207 outside the long edges of the metal film 210. Thus, it is preferable to arrange the grooves 221 to cover the long edges of the electrical connection portion in which the cracks 222 tend to appear in the protective film 207.

According to the print head of the present disclosure, the breakage of components can be suppressed at the time of bonding.

Modification Examples

In the first embodiment, the grooves 221 are formed to entirely cover the long edges of the electrical connection portion for example. However, the formation position of the groove 221 is not limited to this example. Modification examples of the first embodiment will be described with reference to the drawings. In the description below, differences will be mainly explained while assigning the same reference numerals to the same features as the first embodiment and omitting the explanation thereof. In the modification examples, it is preferable to limit the formation area of the groove 221 and the resin film 211 in consideration of various phenomena produced by a decrease in flowability of the first sealing agent 1307 and second sealing agent 1308. Examples of the various phenomena include a reduction in electric reliability caused by a decrease in flowability of the second sealing agent 1308 described above and a trouble at the time of printing.

First, the reduction in electric reliability will be described. In the general electrode terminal 1105, the second sealing agent 1308 is applied on the protective film 207. In contrast, in the present embodiment, the second sealing agent 1308 is applied on the protective film 207 and the resin film 211. At this time, the adhesion between the protective film 207 and the second sealing agent 1308 is greater than the adhesion between the resin film 211 and the second sealing agent 1308. Accordingly, the second sealing agent 1308 applied on the resin film 211 flows more easily than that applied on the protective film 207. This may result in insufficient protection of the electrical connection portion by the second sealing agent 1308 and a decrease in electric reliability. This is the end of the description of the decrease in electric reliability. Next, a trouble in printing will be described. An increase in height of the second sealing agent 1308 from the printing element substrate 1101 may cause a trouble in printing such as paper jamming. This is the end of the description of the trouble in printing. Therefore, it is not preferable to form the groove 221 and the resin film 211 directly below the lead 1304. That is, it is preferable to limit the formation area of the groove 221 and the resin film 211.

Figure 13B:
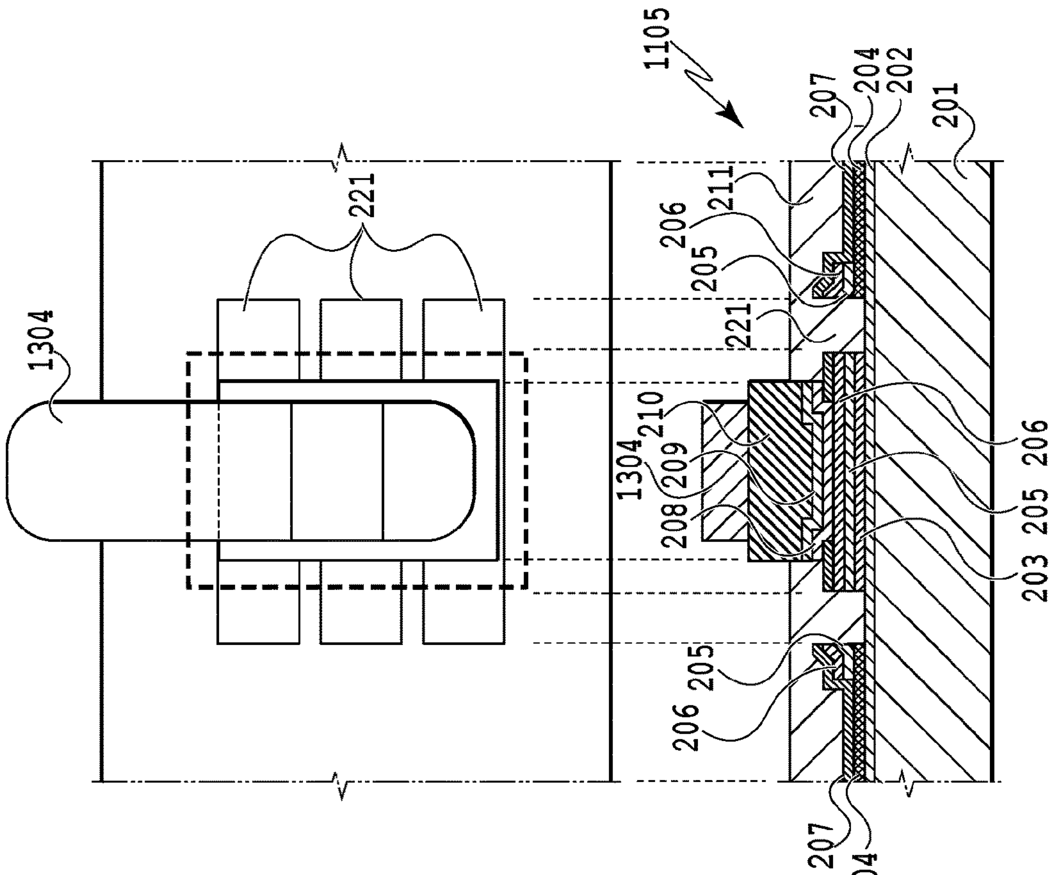
FIGS. 13A to 13D are totally a diagram showing examples of the formation position of the groove.
Figure 13A:
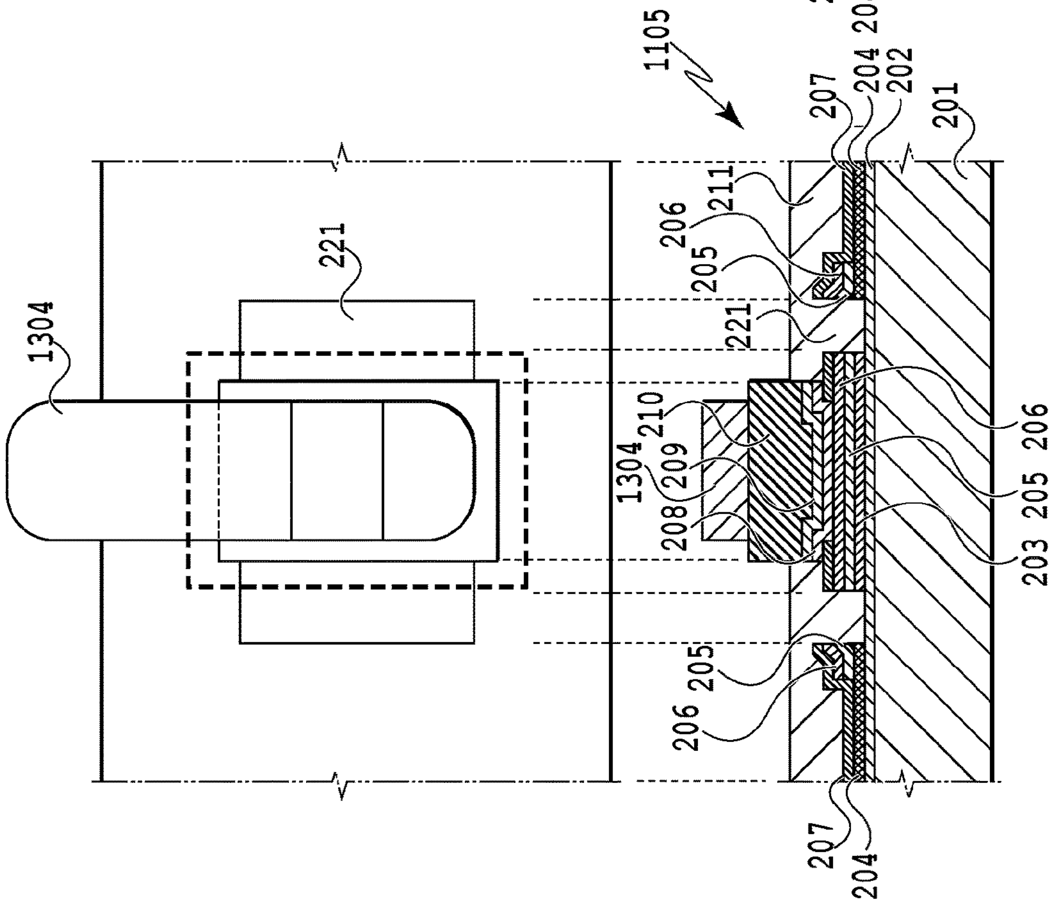
Figure 13D:
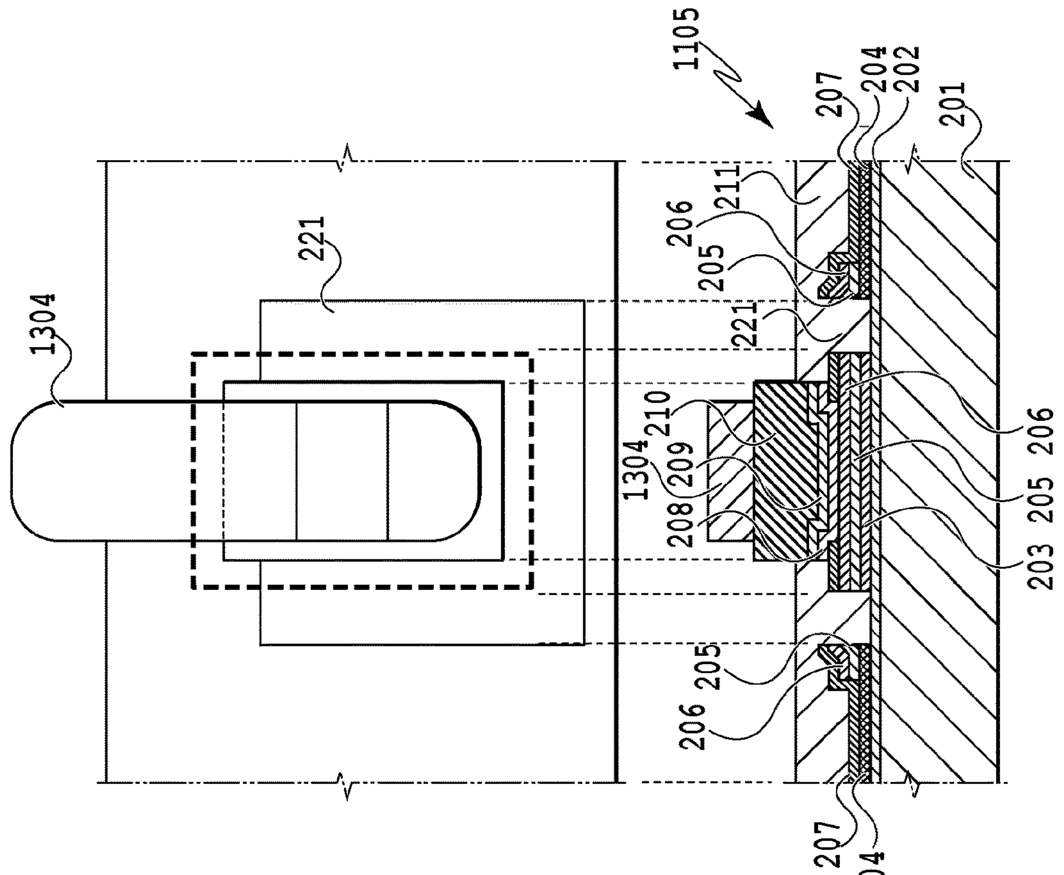
Figure 13C:
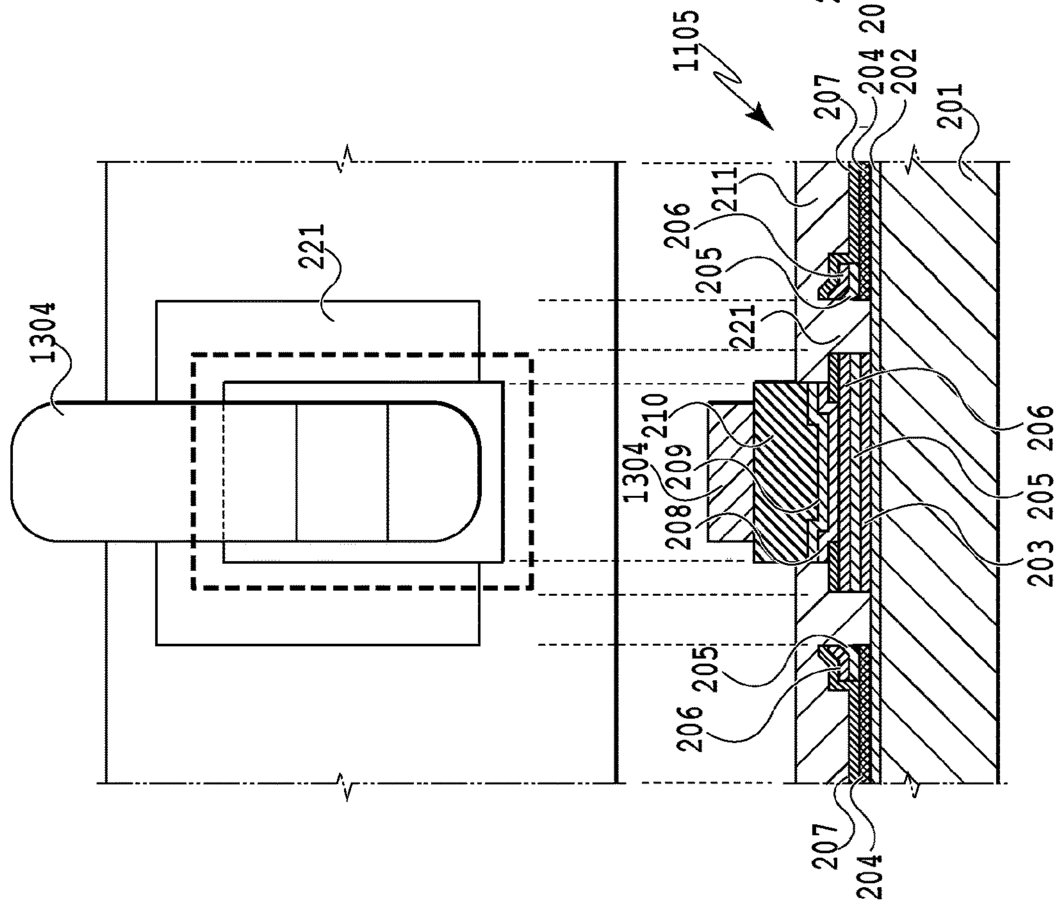

FIGS. 13A to 13D are totally a diagram showing examples of the formation position of the groove 221. FIG. 13A is a diagram showing an example in which the groove 221 is formed on both of the long edges of the electrical connection portion in such positions that the long edges are not entirely covered. According to the electrical connection portion of this modification example, the formation distance of the groove 221 can be shorter than that of the electrical connection portion of the first embodiment. FIG. 13B is a diagram showing an example in which the grooves 221 are intermittently formed outside both of the long edges of the electrical connection portion. According to the electrical connection portion of this modification example, the formation distance of the groove 221 can be further shorter than that of the electrical connection portion shown in FIG. 13A. FIG. 13C is a diagram showing an example in which the groove 221 is continuously formed on the long edges of the electrical connection portion and one of the short edges thereof. In other words, FIG. 13C is a diagram showing an example in which the groove 221 is formed into a ∩ shape. In the case of forming the groove 221 into a ∩ shape, the groove 221 is formed outside either one of the short edges of the metal film 210. According to the electrical connection portion of this modification example, an area to relieve the stress at the time of bonding can be larger than that of the electrical connection portion of the first embodiment. FIG. 13D is a diagram showing an example in which the groove 221 is continuously formed on the long edges of the electrical connection portion and the other short edge than that shown in FIG. 13C. In short, FIG. 13D is a diagram showing an example in which the ∩-shaped groove 221 is formed in an orientation reversed from that shown in FIG. 13C. According to the electrical connection portion of this modification example, an area to relieve the stress at the time of bonding can be larger than that of the electrical connection portion of the first embodiment like the example shown in FIG. 13C. Incidentally, in a case where the electrical connection portion is circular or elliptical, forming the groove 221 into a U shape can produce the same advantageous result as that in the above cases of forming the ∩-shaped groove 221.

Other Embodiments

Incidentally, on the printing element substrate 1101, the ejection opening forming member 1109 forming the ink channel walls 1106 and the ejection openings 1107 and the like are aligned and joined. In order to improve adhesion at the time of joining, there is a case where the adhesion improving layer 208 is provided on the printing element substrate 1101. The adhesion improving layer 208 can also be used as the resin film 211 embedded in the groove 221 around the electrical connection portion. The use of the adhesion improving layer 208 as the resin film 211 embedded in the groove 221 can prevent the number of steps from being increased by separately providing the resin film 211. As described above, even in a case where the pressure is applied to the metal film 210 by bonding, the stress escapes to the groove 221, which prevents the movement following the movement of the metal film 210 and reduces the pressure at the time of bonding. As a result, the deformation of the first electric wiring layer 203 and the second electric wiring layer 206 is suppressed, the stress is prevented from concentrating at the bent portion 212 of the protective film 207, and the cracks 222 can be suppressed from occurring in the protective film 207. Incidentally, although the gang bonding method is used for bonding in the present embodiment, single point bonding may be used instead.

Further, in the technique of the present disclosure, in the manufacturing process of the printing apparatus 100, the step of electrically connecting the printing element substrate 1101 to the electric wiring substrate may be performed in advance. Alternatively, the printing element substrate 1101 and the electric wiring substrate may be separately fixed to a base member and then electrically connected to each other.

Further, in the first embodiment, the technique of the present disclosure is applied to the configuration of the second print head 1002 for color printing which ejects inks of three colors, cyan, magenta, and yellow as an example. However, the technique of the present disclosure may be applied to the first print head 1001 for a black ink. The types of tone (color and density), number, and the like of inks for use in the print head 1000 may also be changed as appropriate.

Further, in the first embodiment, the technique of the present disclosure is applied to the print head 1000 unremovably integrated with the ink storage portion as an example. However, the technique may be applied to the form of the print head 1000 which is removably integrated with or is separate from an ink tank from the viewpoint of a reduction in load imposed on the electrode terminals 1105, the protective film 207, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-137998, filed Aug. 26, 2021 which are hereby incorporated by reference wherein in its entirety.

What is claimed is:

1. A print head with a metal film formed on laminated layers, the print head comprising:
- an electric wiring layer formed below the metal film and electrically connected to the metal film;
- a protective film covering and protecting the electric wiring layer;
- a groove separating the protective film and the electric wiring layer around the metal film; and
- a resin film applied to the groove.

2. The print head according to claim 1, wherein the resin film is formed on a surface of the protective film.

3. The print head according to claim 1, wherein the resin film comprises at least one selected from the group consisting of polyether amide resin, acrylic resin, cyclized rubber, and epoxy resin.

4. The print head according to claim 1, further comprising a lead joined to the metal film.

5. The print head according to claim 1, wherein the groove is formed by photolithography.

6. The print head according to claim 1, wherein the groove is filled with the resin film, and
- a second resin film obtained by curing the resin film is formed on the protective film.

7. The print head according to claim 1, wherein a shape of the metal film is substantially rectangular in a plan view, and
- the groove is formed so as not to entirely surround a periphery of the metal film.

8. The print head according to claim 7, wherein the groove is continuously formed outside both of long edges of the metal film.

9. The print head according to claim 7, wherein the groove is intermittently formed outside both of long edges of the metal film.

10. The print head according to claim 7, wherein the groove is formed outside either one of short edges of the metal film.

* * * * *